(No Model.)

H. A. HOFFMAN.
SPRING HINGE.

No. 571,133. Patented Nov. 10, 1896.

Witnesses
A. M. Loynton.

Inventor
Henry A. Hoffman,
By his Attorneys,
C. A. Snow & Co.

UNITED STATES PATENT OFFICE.

HENRY A. HOFFMAN, OF LANCASTER, OHIO.

SPRING-HINGE.

SPECIFICATION forming part of Letters Patent No. 571,133, dated November 10, 1896.

Application filed March 31, 1896. Serial No. 585,628. (No model.)

*To all whom it may concern:*

Be it known that I, HENRY A. HOFFMAN, a citizen of the United States, residing at Lancaster, in the county of Fairfield and State of Ohio, have invented a new and useful Hinge, of which the following is a specification.

My invention relates to hinges adapted for doors and similar devices; and it has for its objects to provide a spring-hinge adapted to hold the door in either its closed or open position; to provide means whereby when only partly, as half, open the door will be closed by said spring; to provide means whereby when the door is in its open or closed position the spring is not under tension; to provide means whereby the leaves or relatively-movable members of the hinge may be disconnected without dismounting the spring or allowing the displacement thereof, and to otherwise improve and strengthen the construction and means for connecting the parts of a spring-actuated hinge.

Further objects and advantages of this invention will appear in the following description, and the novel features thereof will be particularly pointed out in the appended claims.

Figure 1:
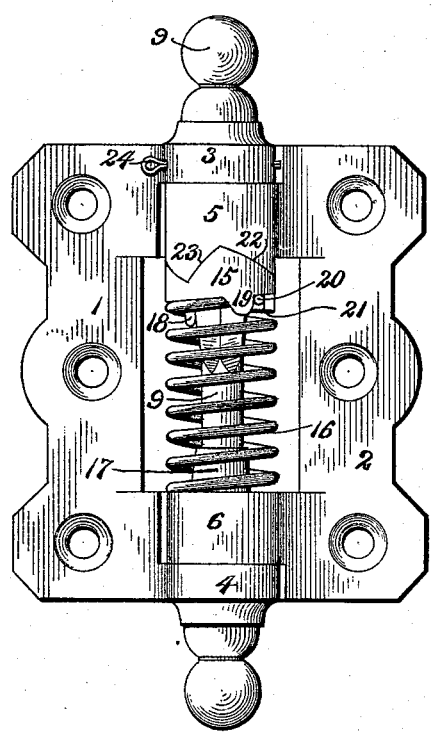
Figure 2:
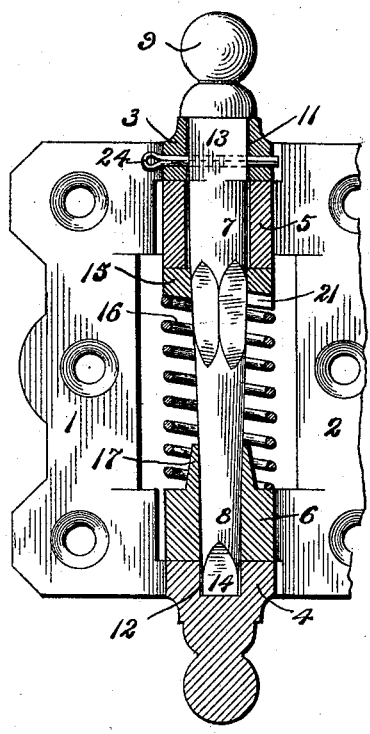
Figure 3:
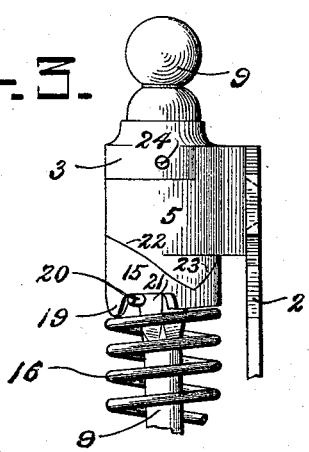
Figure 4:
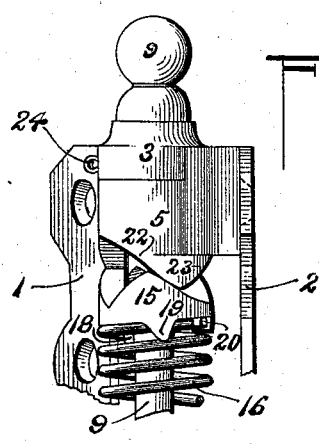

In the drawings, Figure 1 is a front view of a hinge constructed in accordance with my invention. Fig. 2 is a central vertical section of the same. Fig. 3 is a side view of the clutch members and the contiguous portion of the actuating-spring, the parts being shown in the positions which they occupy when the hinge is at rest. Fig. 4 is a similar view showing the positions of the parts when the door is partly opened, or occupies an intermediate position, with the spring under tension.

Similar numerals of reference indicate corresponding parts in all the figures of the drawings.

1 and 2 designate leaves or relatively-movable members of the hinge embodying my invention, said members being provided, respectively, with upper and lower collars 3 and 4 and upper and lower eyes 5 and 6, the latter, which are carried by the member 2, being interposed between the collars 3 and 4 and being round-bored to receive the cylindrical portions 7 and 8 of the hinge-pin 9. The collars 3 and 4 are respectively provided with an angular bore 11 and an angular socket 12 for engagement by the angular enlargement 13 and angular extremity 14 of said hinge-pin.

The upper eye 5 of the member 2 forms one member of a clutch of which the axially-movable member 15 is actuated by a coiled spring 16, the latter being fitted at its lower end over a thimble 17 on the lower eye 6 and being engaged at its upper extremity with depending inner and outer lugs 18 and 19 on the axially-movable clutch member. The spring is provided at its upper end with an outwardly-bent terminal 20, arranged in an elongated notch 21 in the axially-movable clutch member, whereby torsional movement of the spring during its axial expansion and contraction is permitted, as shown relatively in Figs. 3 and 4.

The clutch member 15 is angularly bored to slide axially on an angular portion of the hinge-pin contiguous to and below the round portion 7.

The clutch members are provided with coöperating cam-faces, which consist of a long bevel 22 and a short bevel 23, alternately disposed, the long bevel being brought into operation during the opening of the door, or swinging the leaves or members from a position in a common plane toward a position at right angles to each other, and hence the movable leaf is capable of a movement of greater than ninety degrees before bringing the intersecting-points of the long and short bevels into vertical alinement. Hence, if the door is released before the angles at the intersections of the bevels reach a position in alinement, the door will be closed by the upward pressure of the bevels on the axially-movable clutch member upon the coöperating bevels of the rotary clutch member. If, however, the door is opened far enough to carry the angles at the intersections of the bevels beyond a position of alinement, the short bevels of the clutch members will be brought into operative relation and the door will be opened to a position parallel with its closed position, or with the leaves parallel with each other upon the same side of the hinge-pin. While the long bevels are each of greater length than ninety degrees, the short bevels are of less, and the combined lengths of a long and a contiguous short bevel are equal to one-half, or one hundred and eighty degrees, of the circumference of the clutch, to provide for swinging a door through an arc exceeding ninety degrees without disengaging the long bevels, and at the same time insure the complete opening of the door to a position approximately parallel with its normal or closed position if the opening of the door is carried beyond a given point regulated by the lengths of the long bevels. It will be understood, furthermore, that the short bevels do not interfere with the subsequent closing of the door. The fact that the bevels are short or abrupt requires more force to move the door from its fully-open position to one in which the long bevels are in engagement.

The hinge-pin is secured against accidental displacement by means of a split key 24 or its equivalent.

From the above description it will be seen that the eyes between which the actuating-spring is arranged are carried by the same member or leaf of the hinge and are interposed between the collars of the other member or leaf, and hence the parts of the hinge may be disconnected by the removal of the hinge-pin without dismounting the spring or displacing the clutch members. Furthermore, it is obvious that when the hinge is at rest, or with the leaves either in a common plane or in parallel planes, with the axially-movable clutch member extended, the actuating-spring is practically relieved of strain. It is necessary to change the relative positions of the hinge-leaves in order to apply sufficient tension to the spring to cause it to operate in either closing the door or continuing the opening movement thereof.

Various changes in the form, proportion, and the minor details of construction may be resorted to without departing from the spirit or sacrificing any of the advantages of this invention.

Having described my invention, what I claim is—

1. A hinge having relatively-movable leaves provided respectively with registering eyes and collars, the former being interposed between the latter, a hinge-pin engaging said registering eyes and collars, and a spring-actuated clutch member arranged in operative relation with a clutch-face on one of said eyes and held by the hinge-pin from rotary movement and to slide thereon, substantially as specified.

2. In a hinge, the combination of leaves provided with registering eyes and collars, the former having round and the latter angular openings, a stationary hinge-pin provided with angular portions engaging the openings of the collars and round portions engaging the openings of the eyes, the eyes being interposed between the collars, a clutch member coöperating with a clutch-face on one of said eyes and having an angular opening fitted for axial movement upon an intermediate angular portion of the hinge-pin, and an actuating-spring interposed between and terminally seated upon said clutch member and the other or remote eye, substantially as specified.

3. A hinge having relatively-movable coaxially-mounted leaves, one of which carries a rotary clutch member, and an axially-movable non-rotatable spring-actuated clutch member coöperating with the rotary clutch member, said clutch member being provided with coöperating faces having alternately-disposed and oppositely-inclined long and short bevels, the combined lengths of a long and a contiguous short bevel being equal to one-half or one hundred and eighty degrees of the circumference of the clutch to provide for swinging a door through an arc exceeding ninety degrees without engaging the short bevels, substantially as specified.

In testimony that I claim the foregoing as my own I have hereto affixed my signature in the presence of two witnesses.

HENRY A. HOFFMAN.

Witnesses:
GEO. CUNNINGHAM,
CHARLES WARD.